(12) United States Patent
Edington et al.

(10) Patent No.: US 6,975,092 B2
(45) Date of Patent: Dec. 13, 2005

(54) ENCRYPTED RESPONSE SMART BATTERY

(75) Inventors: Larry G. Edington, Austin, TX (US); James E. Dailey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 201 days.

(21) Appl. No.: 10/613,886

(22) Filed: Jul. 3, 2003

(65) Prior Publication Data

US 2005/0001589 A1 Jan. 6, 2005

(51) Int. Cl.⁷ .................. H01M 10/44; H01M 10/46
(52) U.S. Cl. ........................ 320/106; 713/166
(58) Field of Search ................... 320/106, 107, 320/110, 112; 713/160, 161, 166

(56) References Cited

U.S. PATENT DOCUMENTS

| | | | | |
|---|---|---|---|---|
| 4,590,470 A | * | 5/1986 | Koenig | 705/67 |
| 5,241,599 A | * | 8/1993 | Bellovin et al. | 713/171 |
| 5,673,316 A | * | 9/1997 | Auerbach et al. | 713/176 |
| 5,778,071 A | * | 7/1998 | Caputo et al. | 713/159 |
| 5,838,141 A | | 11/1998 | Sengupta et al. | |
| 5,847,546 A | | 12/1998 | Sengupta et al. | |
| 5,903,764 A | | 5/1999 | Shyr et al. | |
| 6,025,698 A | | 2/2000 | Kim et al. | |
| 6,457,126 B1 | * | 9/2002 | Nakamura et al. | 713/166 |
| 6,509,717 B2 | | 1/2003 | Lee | |

* cited by examiner

*Primary Examiner*—Edward H. Tso
(74) *Attorney, Agent, or Firm*—Haynes amd Boone, LLP (57) ABSTRACT

In a method and system for authenticating a smart battery for charging, the smart battery receives an encrypted random string. The smart battery is operable to provide power to a device. The encrypted random string is generated by a controller of the device by generating a random string and encrypting the random string with an encryption key. The smart battery decrypts the encrypted random string with the encryption key to recover the random string and transfer the random string to the device. The device verifies that the random string is unchanged to authenticate the smart battery for the charging. If the random string has been modified then the smart battery is disabled from the charging.

22 Claims, 4 Drawing Sheets

ENCRYPTED RESPONSE SMART BATTERY

BACKGROUND

The present disclosure relates generally to information handling systems, and more particularly to techniques for authenticating rechargeable smart batteries commonly used to provide power to portable information handling system components such as notebook computers, personal digital assistants, cellular phones and gaming consoles.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by passing an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, since typically, a user of the device powered by the battery had no reliable advance warning that the energy supplied by the rechargeable battery was about to run out.

Today, through the development of "smart" or "intelligent" battery packs, batteries have become a more reliable source of power by providing information to a device of the information handling system and eventually to a user as to the state of charge, as well as a wealth of other information. The smart rechargeable battery, which is well known, is typically equipped with electronic circuitry to monitor and control the operation of the battery. The information is typically communicated using a well-known System Management Bus (SMBus), which is widely used in the industry. Information pertaining to the smart battery and being communicated via the SMBus connection may include data elements such as smart battery status, manufacturer name, serial and model number, voltage, temperature and charge status.

Smart batteries, which may be original equipment manufactured (OEM) or in-house manufactured, typically undergo extensive testing and validation procedures before they are approved and qualified to be included in a portable information handling system device by the manufacturer of the portable device. The portable device powered by the smart battery may also undergo additional testing prior to being shipped to a customer. The high cost of many smart batteries has attracted an increasing number of counterfeit smart battery vendors to (re)manufacture and sell genuine-like smart batteries at lower prices to unsuspecting customers. The counterfeit batteries are typically able to emulate virtually any genuine smart battery by emulating their manufacturer, model name, and serial number. An authentication process to identify the genuine smart batteries is almost non-existent. These counterfeit batteries, which often go through very minimal testing and validation procedures, may pose as a serious hazard to the unsuspecting customers. For example, if the counterfeit smart battery does not properly safeguard the charging process then excessive heating caused during the charging process may cause an explosion. This may result in a significant liability problem for the manufacturers of the information handling system device and/or the OEM smart battery.

Therefore a need exists to properly safeguard the charging process of a smart battery. More specifically, a need exists to develop tools and techniques for disabling the charging process for counterfeit smart batteries. Accordingly, it would be desirable to provide tools and techniques for charging authenticated smart batteries included in an information handling system absent the disadvantages found in the prior methods discussed above.

SUMMARY

The foregoing need is addressed by the teachings of the present disclosure, which relates to a system and method for authenticating a smart battery to ensure a safe charging process. According to one embodiment, in a method and system for authenticating a smart battery for charging, the smart battery receives an encrypted random string. The smart battery is operable to provide power to an information handling system device. In this embodiment, the device performs the encryption function and the smart battery performs the decryption function. A controller of the device generates the encrypted random string by generating a random string and encrypting the random string with an encryption key. The smart battery decrypts the encrypted random string with the encryption key to recover the random string and transfer the random string to the device. The device verifies that the random string is unchanged to authenticate the smart battery for the charging. If the random string has been modified then the smart battery is disabled from the charging.

In one embodiment, the encryption/decryption function is performed by the device and the smart battery. In this embodiment, the smart battery encrypts the recovered random string with another encryption key. The encrypted random string is transferred to the device. The device decrypts the encrypted random string with the another encryption key to recover the random string. The device verifies that the random string is unchanged to authenticate the smart battery for the charging. If the random string has been modified then the smart battery is disabled from the charging. The use of two encryption keys advantageously provides additional security in the authentication process.

Several advantages are achieved by the method and system according to the illustrative embodiments presented herein. The embodiments advantageously provide for a reduced occurrence of operating conflicts and improved reliability while reducing the number of components.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

The following terminology may be useful in understanding the present disclosure. It is to be understood that the terminology described herein is for the purpose of description and should not be regarded as limiting.

Cryptography—A technique of protecting information by transforming a piece of information (encrypting it) with a secret encryption key into an unintelligible format. Only users who possess the secret key may be able to decipher (or decrypt, or recover) the message into the original piece of information. Cryptography systems are broadly classified into symmetric-key systems that use a single private key that both the sender and recipient have, and public-key systems that use two keys, a public key known to everyone and a private key that is only known to the recipient of the message.

Encryption and decryption—Encryption is the process of transforming information so it is unintelligible to anyone but the intended recipient. Decryption is the process of transforming encrypted information so that it is intelligible again.

Cryptographic algorithm and key—A cryptographic algorithm is a mathematical function used for encryption or decryption. In most cases, the ability to keep encrypted information confidential is based not on the cryptographic algorithm, which is widely known, but on a number called a 'key' that is used with the algorithm to produce an encrypted result or to decrypt previously encrypted information. Decryption with the correct key is simple. Decryption without the correct key is virtually impossible. Encryption strength is often described in terms of the size of the keys used to perform the encryption: in general, longer keys provide stronger protection of information.

Authentication—It is the process of confirming an identity. In the context of smart batteries, authentication involves the confident identification of a genuine smart battery by another device external to the smart battery.

Counterfeit smart batteries may not provide adequate safeguards to protect the occurrence of unsafe conditions such as over heating during the charging process. In some instances the over heating condition may cause an explosion. There is a need to ensure the safe and secure operation of information system device and the smart battery, especially during the charging phase of the smart battery. According to one embodiment, in a method and system for authenticating a smart battery for charging, the smart battery receives an encrypted random string. In this embodiment, the device performs the encryption function and the smart battery performs the decryption function. A controller of the device generates the encrypted random string by generating a random string and encrypting the random string with an encryption key. The smart battery decrypts the encrypted random string with the encryption key to recover the random string and transfer the random string to the controller. The controller verifies that the random string is unchanged to authenticate the smart battery for the charging. If the random string has been modified then the smart battery is disabled from the charging.

Figure 1:
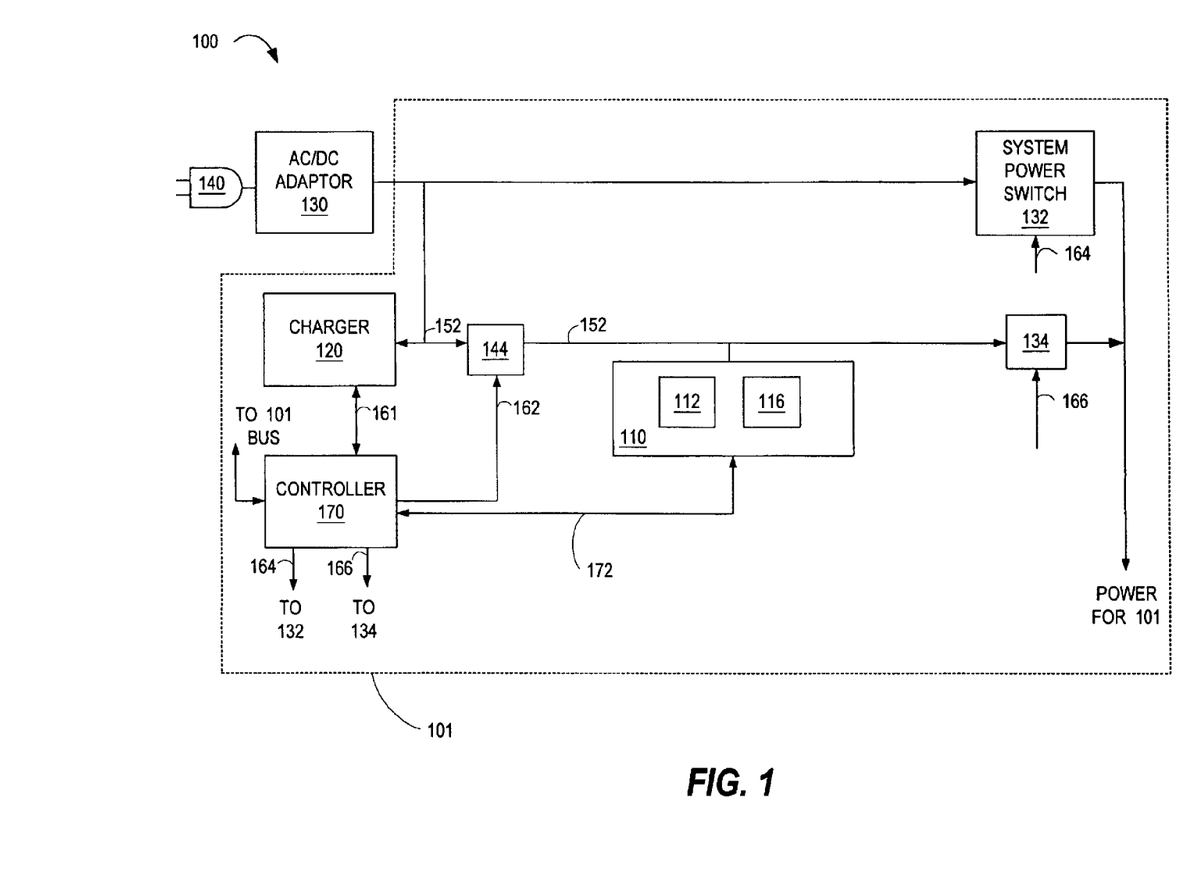
FIG. 1 illustrates a diagrammatic representation of a smart battery authentication system for authenticating a smart battery, according to an embodiment.

FIG. 1 illustrates a diagrammatic representation of a smart battery authentication system 100 for authenticating a smart battery 110, according to an embodiment. The smart battery 110 and/or an AC power source 140 provides power to a portable information handling system device 101. The smart battery authentication system 100 includes: 1) the smart battery 110 having a smart electronics 112 device and at least one rechargeable cell 116, 2) a controller 170 included in the portable device 101 for controlling the operation of power sources such as the battery 110 via control line 172 and the AC power source 140, 3) the AC power source 140, 4) an AC/DC adaptor device 130 for converting the AC voltage/power to DC voltage/power, 5) a charger device 120 providing the charge to the smart batteries 110 via a charge line 152, 6) an AC power source switch 132 for controlling the flow of power from the AC/DC adaptor 130 to the portable device 101 by control line 164, 7) a primary discharge switch 134 for controlling the flow of power from the smart battery 110 to the portable device 101 by control line 166, and 8) a primary charge switch 144 for controlling the flow of power from the charger 120 to the smart battery 110 by control line 162.

In one embodiment, items 1–2, and 5–8 may be included in the device 101, while items 3 and 4 are external to the device 101. In one embodiment, a power supply system (not shown) includes items 1, and 4–8. In one embodiment, the device 101 includes an electrical circuit (not shown) operable to provide a charge to the smart battery 110.

In one embodiment, each of the switches 132, 134 and 144 are implemented using MOSFET body diode devices. The MOSFET body diodes are advantageously used to minimize the impact of an accidental reverse connection of the battery 110 or other over-current causing conditions. The MOSFET body diodes are also useful to maximize the availability of power to the device 101.

The controller 170 included in the portable device 101 is operable to control various inputs and outputs of the device 101. For example, the controller 170 may be used to control inputs and outputs of a keyboard (not shown) of the device 101 via a bus (not shown) such as the SMBus (not shown). In this embodiment, the controller 170 is operable to authenticate the smart battery 110. The controller 170 advantageously safeguards the charging process by enabling authenticated smart batteries to receive the charge from the charger device 120 and disabling counterfeit smart batteries from receiving the charge. As described herein any smart battery, which has failed the authentication process, is identified as a counterfeit smart battery.

The controller 170 is operable to receive inputs from various power sources and loads to control the flow of power from the various sources of power such as the smart battery 110 and the AC power source 140 to the various loads such as the portable device 101. The controller 170 controls the charger 120 by a control line 161. In one embodiment, a Basic Input Output System (BIOS) program (not shown) may be used to receive inputs and generate outputs.

In one embodiment, the battery charge line 152 and the control lines 162, 172, 164, 166 may be implemented using the SMBus (not shown). In one embodiment, the battery charge line 152 and the control lines 162, 172, 164, 166 may be implemented using dedicated, electrically conducting lines or paths.

The smart battery 110 includes the smart electronics 112 to control the operating condition of the battery 110 and monitor various battery variables such as voltage, current, temperature, and charge level. The smart battery 110 includes at least one rechargeable cell 116. Other cells may be present but are not shown. The smart electronics 112 is electrically coupled to the battery charge line 152 and the control line 172 for interfacing with external devices such as the charger device 120 and the controller 170 respectively. Another embodiment of the smart battery 110 is described in FIG. 2.

The smart electronics 112 and the controller 170 jointly control: a) the operating condition of the smart battery 110 such as the charging or discharging operation, and b) the authentication process of the smart battery 110 to enable the charging operation. More specifically, the smart electronics 112 monitors the energy level of the rechargeable cell 116. When requested by the controller 170, the smart electronics 112 is operable to provide energy stored in the rechargeable cell 116 to the portable device 101 during a discharge operating condition. The smart electronics 112 is operable to notify the controller 170 when the energy level of the rechargeable cell 105 falls below a predefined threshold level. During a charge operating condition, the smart electronics 112 is operable to receive a charge from the charger 120 via the charge line 152 and transfer the charge to the rechargeable cell 116 when required.

In one embodiment, the controller 170 generating a random string initiates the authentication process. Additional details of the authentication process are described in FIG. 3. The random string includes alphanumeric characters. In one embodiment, the random string is a random number. The controller 170 also includes encryption hardware or software to encrypt the random string with an encryption key. In one embodiment, the encryption key is of a predefined length and is private. The output of the encryption process performed by the controller 170 is an encrypted random string. In one embodiment, a processor (not shown) of the device 101 performs the generation of the random string and the encrypted random string.

The smart electronics 112 of the smart battery 110 is operable to receive the encrypted random string generated by the controller 170. The smart electronics 112 decrypts the encrypted random string with the same encryption key used by the controller 170 for the encryption process. As a result of the decryption process the smart electronics 112 recovers the random string. The random string, which has been recovered by the smart battery 110, is transferred to the controller 170 for authentication. The controller 170 authenticates the smart battery 110 by determining if the random string has changed compared to the original. If there is no change in the random string then the smart battery 110 is authentic. However, if the random string has changed then the smart battery 110 is identified as a counterfeit.

Figure 2:
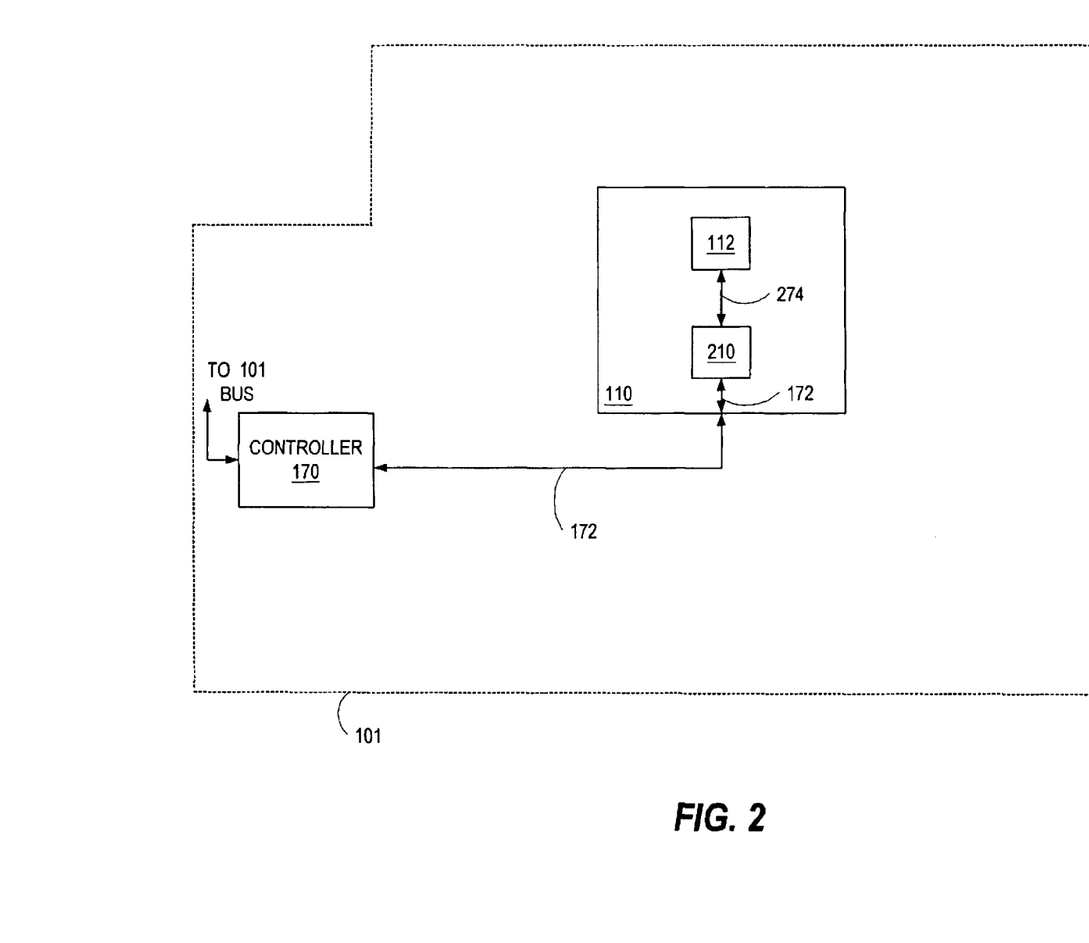
FIG. 2 illustrates a diagrammatic representation of the smart battery system of FIG. 1 having a processor and smart electronics, according to an embodiment.

FIG. 2 illustrates a diagrammatic representation of the smart battery 110 having a processor 210 and the smart electronics 112, according to an embodiment. In this embodiment, the functions associated with the authentication process are performed by the processor 210, while the smart electronics 112 is operable to control the operating condition of the battery 110 and monitor various battery variables as described earlier.

The authentication process is implemented using a single encryption step and a single decryption step described earlier in FIG. 1. In one embodiment, to further improve the authentication process, a two-step encryption/decryption process is implemented, as described in further detail in FIG. 3. In the two-step authentication process the smart battery 110 performs the decryption as well as the encryption step. Thus, the processor 210 is operable to advantageously perform the encryption and/or decryption functions described earlier. In addition, the processor 210 also handles communications with the controller 170 through the control line 172, and with the smart electronics 112 through a control line 274. In one embodiment, control lines 172 and 274 use the SMBus. The addition of the processor 210 advantageously reduces the complexity of the smart electronics 112.

Figure 3:
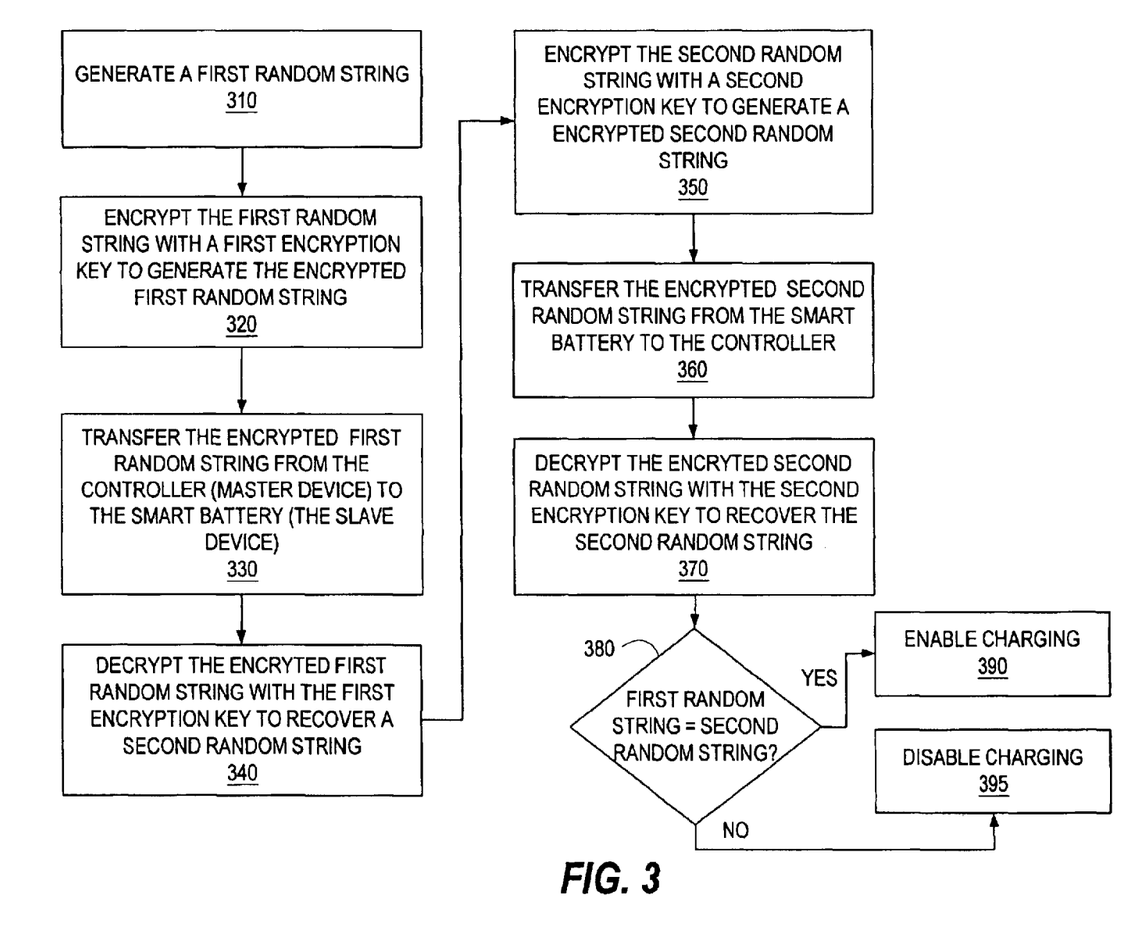
FIG. 3 is a flow chart illustrating a method for authenticating the smart battery, according to an embodiment.

FIG. 3 is a flow chart illustrating a method for authenticating the smart battery 110, according to one embodiment. In this embodiment, a two-step authentication process for authenticating the smart battery 110 is described. In step 310, the controller 170 generates a first random string. The first random string includes alphanumeric characters. In one embodiment, the first random string is a random number. In step 320, the controller 170 includes encryption hardware or software to encrypt the first random string with a first encryption key. In one embodiment, the first encryption key is of a predefined length and is private. The output of the encryption process performed by the controller 170 is a first encrypted random string. In step 330, the controller 170 (acting as the master device) transfers the first encrypted random string to the smart battery 110 (acting as the slave device). In step 340, the smart battery 110 decrypts the encrypted first random string with the first encryption key to recover a second random string. The second random string may or may not be the same as the first random string depending on the authenticity of the smart battery 110. In step 350, the smart battery 110 encrypts the second random string with a second encryption key to generate the encrypted second random string. In step 360, the encrypted second random string is transferred from the smart battery 110 to the controller 170. In step 370, the controller 170 decrypts the encrypted second random string with the second encryption key to recover the second random string. In step 380, authentication of the smart battery 110 includes verifying the first random string and the second random string match. In step 390, if the smart battery 110 is identified to be authentic then the charging operation is enabled. In step 395, if the smart battery 110 is identified to be a counterfeit then the charging operation is disabled.

Various steps described above may be added, omitted, combined, altered, or performed in different orders. For example, steps 310, 320 and 330 may be combined into a single step 335 in which the smart battery 110 receives the encrypted first random string.

Figure 4:
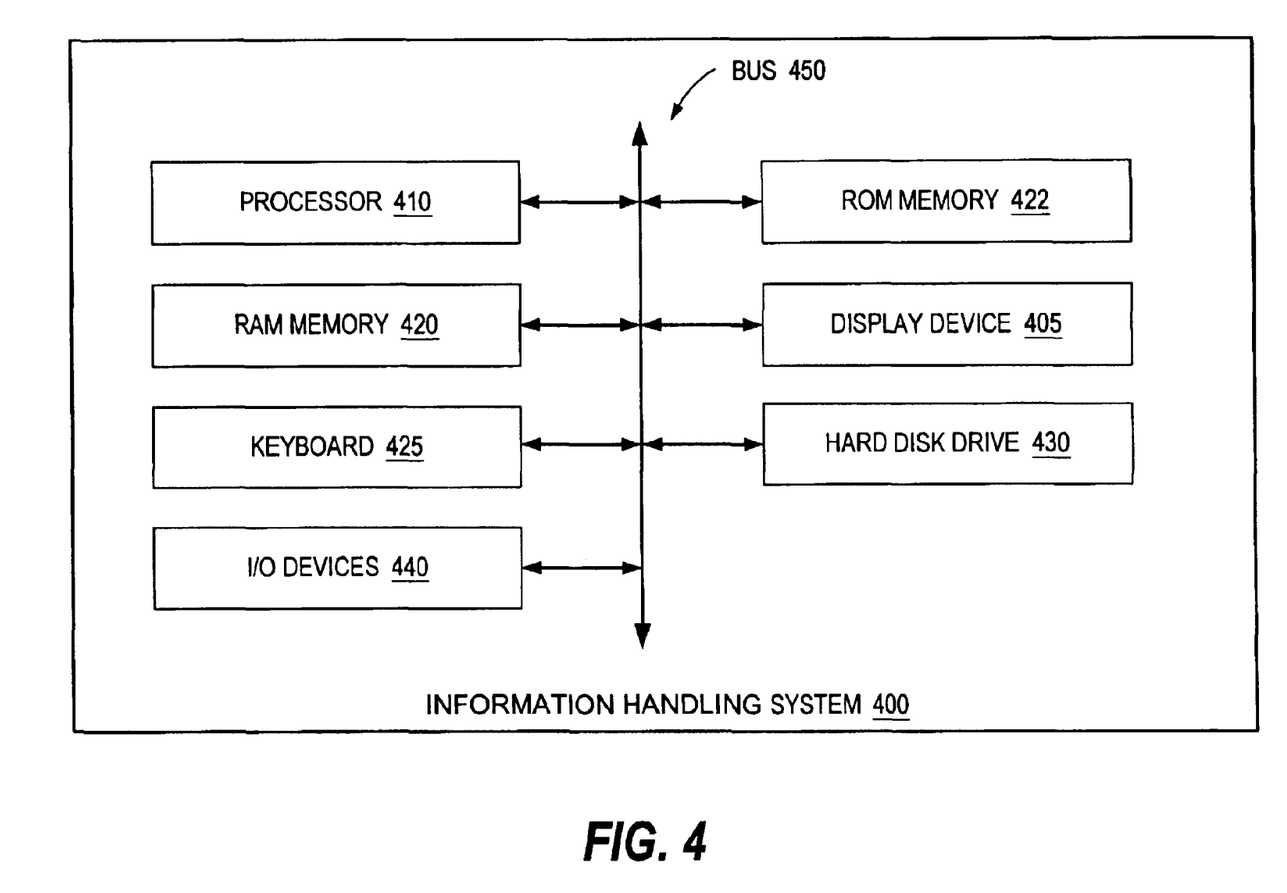
FIG. 4 illustrates a block diagram of an information handling system to implement method or apparatus aspects of the present disclosure, according to an embodiment.

FIG. 4 illustrates a block diagram of an information handling system to implement method or apparatus aspects of the present disclosure, according to an embodiment. For purposes of this disclosure, an information handling system 400 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 400 may be a personal computer, a network storage device, or any other suitable device and may vary in size, shape, performance, functionality, and price.

The information handling system 400 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 4, the information handling system 400 includes a processor 410, a system random access memory (RAM) 420, a system ROM 422, a display device 405, a keyboard 425 and various other input/output devices 440. It should be understood that the term "information handling system" is intended to encompass any device having a processor that executes instructions from a memory medium. The information handling system 400 is shown to include a hard disk drive 430 connected to the processor 410 although some embodiments may not include the hard disk drive 430. The processor 410 communicates with the system components via a bus 450, which includes data, address and control lines. A communications device (not shown) may also be connected to the bus 450 to enable information exchange between the system 400 and other devices.

In one embodiment, the information handling system 400 may be used to implement the portable information handling system device 101 described in FIG. 1. The smart battery system 110 (not shown) may be configured to provide power to the information handling system 400. In one embodiment, the processor 210 and processor 410 may be similar.

The processor 410 is operable to execute the computing instructions and/or operations of the information handling system 400. The memory medium, e.g., RAM 420, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for charging a smart battery, the method comprising:

receiving an encrypted random string, wherein the encrypted random string includes a random string in an encrypted form;

decrypting the encrypted random string to recover the random string; and transferring the random string to a device to authenticate the smart battery for the charging, the device being electrically coupled to the smart battery.

2. The method of claim 1, wherein the receiving comprises:

generating a random string, the random string being generated by the device;

encrypting the random string, the random string being encrypted with an encryption key included in the device to generate the encrypted random string; and transferring the encrypted random string, the encrypted random string being transferred from the device to the smart battery.

3. The method of claim 2, wherein the decrypting requires the encryption key.

4. The method of claim 2, wherein the encryption key is a private key.

5. The method of claim 2, wherein the encrypted form is defined by the device and includes the encryption key to encrypt the random string.

6. The method of claim 2, wherein the encryption key is at least 8 bits.

7. The method of claim 2, wherein the generating, encrypting and transferring are performed by a controller included in the device, wherein the device is included in an information handling system.

8. The method of claim 1, wherein the device authenticates the smart battery by verifying the random string is unchanged.

9. The method of claim 8, wherein the device identifies the smart battery as a counterfeit when the random string is changed and disables the charging of the counterfeit.

10. The method of claim 1, wherein the encrypted form is defined by the device and includes an encryption key to encrypt the random string.

11. The method of claim 1, wherein the random string is alpha numeric.

12. The method of claim 1, wherein the random string is a random number.

13. The method of claim 1, wherein the transferring of the random string is via an SMBus.

14. A method for authenticating a smart battery, the method comprising:

generating a first random string, the first random string being generated by a device electrically coupled to the smart battery;

encrypting the first random string, the first random string being encrypted with a first encryption key included in the device to generate the encrypted first random string;

transferring the encrypted first random string, the encrypted first random string being transferred from the device to the smart battery;

decrypting the encrypted first random string with the first encryption key to recover a second random string;

encrypting the second random string, the second random string being encrypted with a second encryption key included in the smart battery to generate the encrypted second random string;

transferring the encrypted second random string, the encrypted second random string being transferred from the smart battery to the device;

decrypting the encrypted second random string with the second encryption key to recover the second random string; and verifying the first random string and the second random string match to authenticate the smart battery.

15. The method of claim 14, wherein each of the first and second encryption keys is a private key.

16. The method of claim 14, wherein each of the first and second encryption keys is at least 8 bits.

17. The method of claim 14, wherein each of the first and second random strings is a random number.

18. A smart battery authentication system comprising:
a smart battery, wherein the smart battery includes:
a smart electronics device operable to:
receive an encrypted random string, wherein the encrypted random string includes a random string in an encrypted form;
decrypt the encrypted random string to recover the random string; and
transfer the random string to a controller to authenticate the smart battery;
a communications bus for electrically coupling the smart electronics to the controller; and
the controller operable to authenticate the smart battery by generating the random string, generating the encrypted random string and verifying the random string is unchanged.

19. The system of claim 18, wherein the encrypted form is defined by the controller and includes an encryption key to encrypt the random string.

20. The system of claim 18, wherein the random string is a random number.

21. An information handling system comprising:
a processor;
a system bus;
a memory coupled to the processor through the system bus;
a power supply system operable to provide power to the processor, the bus and the memory, the power supply system being connectable to an AC adapter for deriving power from an AC power source;
a controller coupled to the processor and memory through the system bus, the controller operable to control the power supply system; and
wherein the power supply system includes:
a smart battery having a smart electronics, the smart electronics being operable to:
receive an encrypted random string, wherein the encrypted random string includes a random string in an encrypted form;
decrypt the encrypted random string to recover the random string; and
transfer the random string to the controller to authenticate the smart battery.

22. The system of claim 21, wherein the controller is operable to authenticate the smart battery by generating the random string, generating the encrypted random string and verifying the random string is unchanged.

\* \* \* \* \*

UNITED STATES PATENT AND TRADEMARK OFFICE
CERTIFICATE OF CORRECTION

PATENT NO. : 6,975,092 B2
DATED : December 13, 2005
INVENTOR(S) : Edington et al.

It is certified that error appears in the above-identified patent and that said Letters Patent is hereby corrected as shown below:

Column 9,
Line 11, delete "a smart" and replace with -- an --;
Line 19, delete "smart";
Line 20, insert -- device -- after "electronics";

Column 10,
Line 16, delete the second occurrence of "a smart" and replace with -- an --;
Lines 16 and 17, insert -- device -- after "electronics";
Line 16, delete the third occurrence of "a smart".

Signed and Sealed this

Twenty-first Day of February, 2006

JON W. DUDAS
*Director of the United States Patent and Trademark Office*